United States Patent
Ksiezopolski et al.

(10) Patent No.: US 7,614,676 B2
(45) Date of Patent: Nov. 10, 2009

(54) RESILIENT SEAL FOR MOBILE LIVING QUARTERS

(75) Inventors: Edwin E. Ksiezopolski, Granger, IN (US); Norman L. Newhouse, Mishakawa, IN (US)

(73) Assignee: Lifetime Industries, Inc., Elkhart, IN (US)

( * ) Notice: Subject to any disclaimer, the term of this patent is extended or adjusted under 35 U.S.C. 154(b) by 415 days.

(21) Appl. No.: 11/466,235

(22) Filed: Aug. 22, 2006

(65) Prior Publication Data

US 2008/0073925 A1     Mar. 27, 2008

(51) Int. Cl.
*B60P 3/34* (2006.01)

(52) U.S. Cl. .............. 296/26.09; 296/171; 296/175; 296/26.13

(58) Field of Classification Search ........... 296/165, 296/171, 175, 26.09, 26.13; 52/67
See application file for complete search history.

(56) References Cited

U.S. PATENT DOCUMENTS

| | | | |
|---|---|---|---|
| 3,719,386 A | 3/1973 | Puckett et al. | |
| 4,361,348 A | 11/1982 | Rapp et al. | |
| 5,237,782 A | 8/1993 | Cooper | |
| 5,785,373 A * | 7/1998 | Futrell et al. | 296/26.01 |
| 5,788,306 A | 8/1998 | DiBiagio et al. | |
| 5,791,715 A | 8/1998 | Nebel | |
| 5,894,698 A | 4/1999 | Dewald, Jr. et al. | |
| 6,048,016 A | 4/2000 | Futrell et al. | |
| 6,094,870 A | 8/2000 | Stacy | |
| 6,152,516 A | 11/2000 | Williams | |
| 6,176,045 B1 * | 1/2001 | McManus et al. | 52/67 |
| 6,224,126 B1 | 5/2001 | Martin et al. | |
| 6,401,398 B1 | 6/2002 | Panayides et al. | |
| 6,428,073 B1 | 8/2002 | Blodgett, Jr. | |
| 6,527,324 B2 | 3/2003 | McManus et al. | |
| 6,572,170 B2 | 6/2003 | McManus | |
| 6,598,354 B2 * | 7/2003 | McManus et al. | 52/67 |
| 6,619,726 B2 * | 9/2003 | Jones | 296/163 |
| 6,966,590 B1 | 11/2005 | Ksiezopolski et al. | |
| 7,380,854 B1 * | 6/2008 | Hanser et al. | 296/26.13 |
| 2002/0078634 A1 | 6/2002 | McManus et al. | |
| 2006/0091687 A1 * | 5/2006 | Schoffner et al. | 296/26.01 |
| 2008/0116707 A1 * | 5/2008 | Boaz et al. | 296/26.01 |
| 2008/0265618 A1 * | 10/2008 | Cadena et al. | 296/175 |

FOREIGN PATENT DOCUMENTS

| | | |
|---|---|---|
| WO | WO 99/33683 | 7/1999 |
| WO | WO 02/30705 | 4/2002 |

* cited by examiner

*Primary Examiner*—Jason S Morrow
(74) *Attorney, Agent, or Firm*—Botkin & Hall, LLP

(57) ABSTRACT

A resilient seal for mobile living quarters seals around a slide-out room includes a pair of attaching members extending along the inside and outside surfaces of the main living area wall at an aperture through which the slide-out room moves and further includes a connecting member extending between the attaching members and along the edge of the wall defining the aperture. A wiper seal extends from the connecting member to flex against the walls of the slide-out room, and the connecting member further includes an accordion pleat for adjusting the distance between the attaching members to thereby accommodate walls of different thicknesses.

4 Claims, 6 Drawing Sheets

RESILIENT SEAL FOR MOBILE LIVING QUARTERS

BACKGROUND OF THE INVENTION

1. Field of the Invention

This invention relates to a resilient seal for sealing between a slide-out room and the main living quarters of mobile living quarters, such as a recreational vehicle.

2. Description of the Background of the Invention

Mobile living quarters, such as motor homes, travel trailers, and similar types of recreational vehicles, are commonly equipped with one or more slide-out rooms that are retracted within the main living quarters when the unit is transported, but which can be extended from the main living quarters to provide auxiliary space when the unit is parked for use. Commonly, a bulb seal extends around the aperture defined in the outside of the sidewall of the main living quarters through which the slide-out room extends and retracts. This seal is engaged by a first flange on the slide-out room to seal the gap between the slide-out room and the main living quarters when the slide-out room is retracted. Similarly, a second bulb seal extends around the aperture on the inside of the sidewall and is engaged by a second flange (offset axially from the first flange) when the slide-out room is extended for use. A wiper seal mounted on the sidewall extends into the aperture and is flexed against the corresponding walls of the slide-out room. The bulb seals seal the slide-out room in the extended and retracted positions, and the wiper seal wipes against the slide-out room as it is extended and retracted to prevent moisture and debris to enter the living quarters. A similar prior art seal is disclosed in U.S. Pat. No. 6,966,590.

Ideally, two or more of the aforementioned seals are combined into a single member for ease of installation. Commonly, the seals are manufactured continuously, so that an appropriate length may be cut off and installed when the mobile living quarters is manufactured, and the bulb seals are commonly manufactured separately from underlying attachment members that are initially installed on the mobile living quarters with the bulb seals themselves snapped onto the attachment members or slid along the attachment members after the latter are installed.

Obviously, to ease manufacture, it is desirable that the attachment members for the inside and outside and the wiper seals are made in one piece, to thereby facilitate installation. One problem with prior art seals in which the inside and outside attachment members were part of a common sealing unit is that the unit had to include a connecting portion which extended across the aperture. Since different manufacturers, and different models made by the same manufacturer, may have walls of different thicknesses, either different sealing assemblies or separate seals must be used. Clearly, it is desirable to have a common sealing assembly that can be used on all mobile living quarter designs, even though they may have different wall thicknesses.

SUMMARY OF THE INVENTION

According to the invention, a resilient seal for mobile living quarters is provided for sealing around a slide-out room of mobile living quarters having an aperture slidably receiving a slide-out room. The resilient seal has a pair of attaching members extending along the inside and outside surfaces of the main living area wall at the aperture and further include a connecting member extending between the attaching members and along the edge of the wall defining the aperture. A wiper seal extends from the connecting member, which flexes against the walls of the slide-out room, and the connecting member further includes an accordion pleat for adjusting the distance between the attaching members to thereby accommodate walls of different thicknesses.

DETAILED DESCRIPTION OF INVENTION

Figure 1:
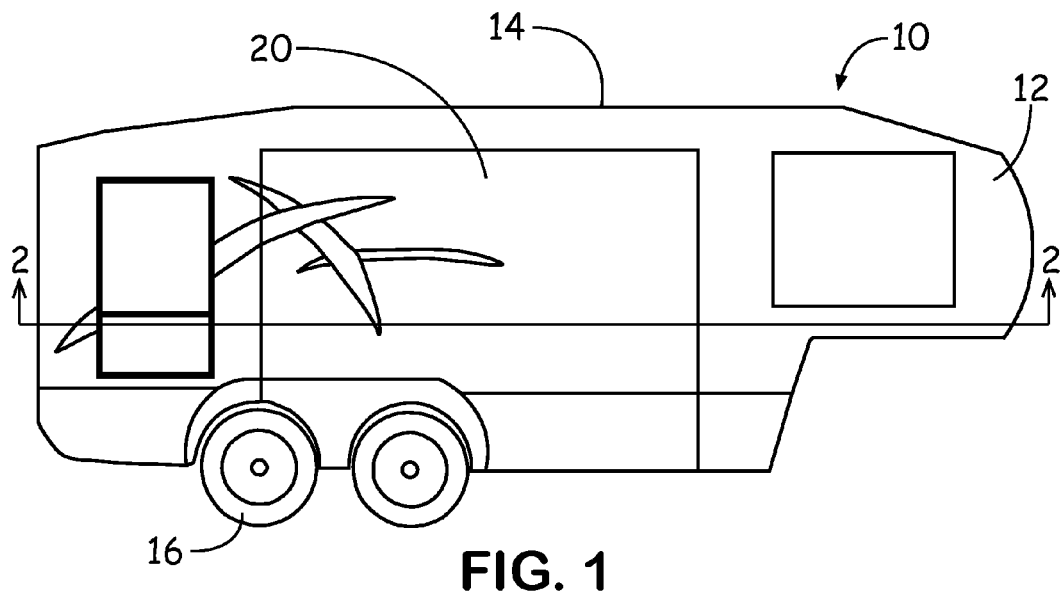
FIG. 1 is a side view of a mobile living quarters incorporating a resilient seal made pursuant to the teachings of the present invention.
Figure 2:
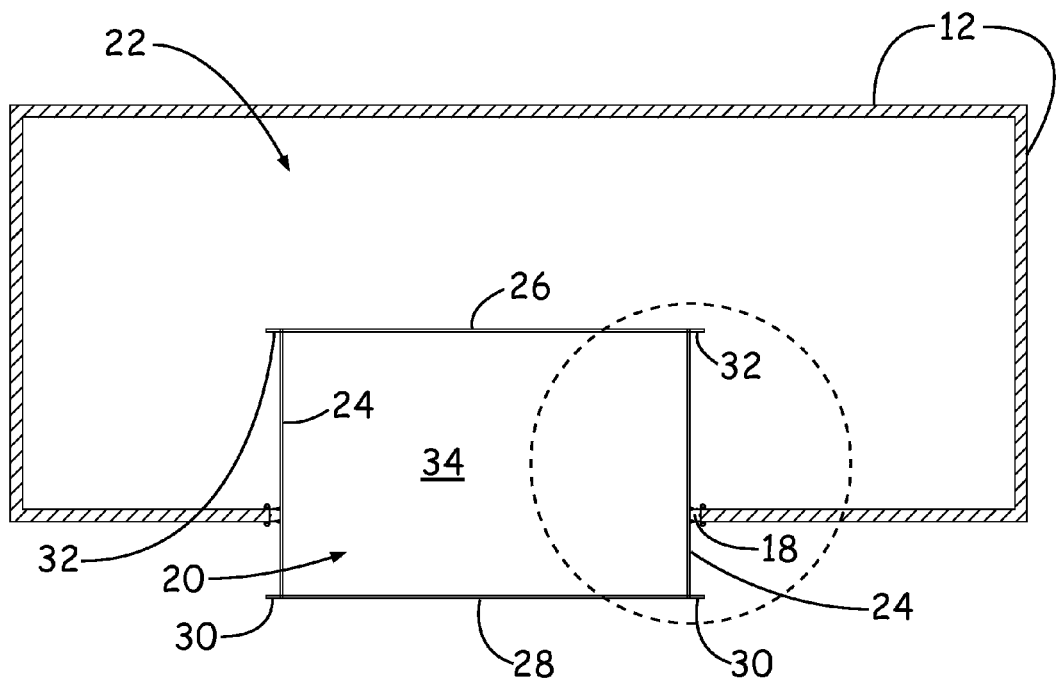
FIG. 2 is a cross-sectional view taken substantially along lines 2-2 of FIG. 1.
Figure 3:
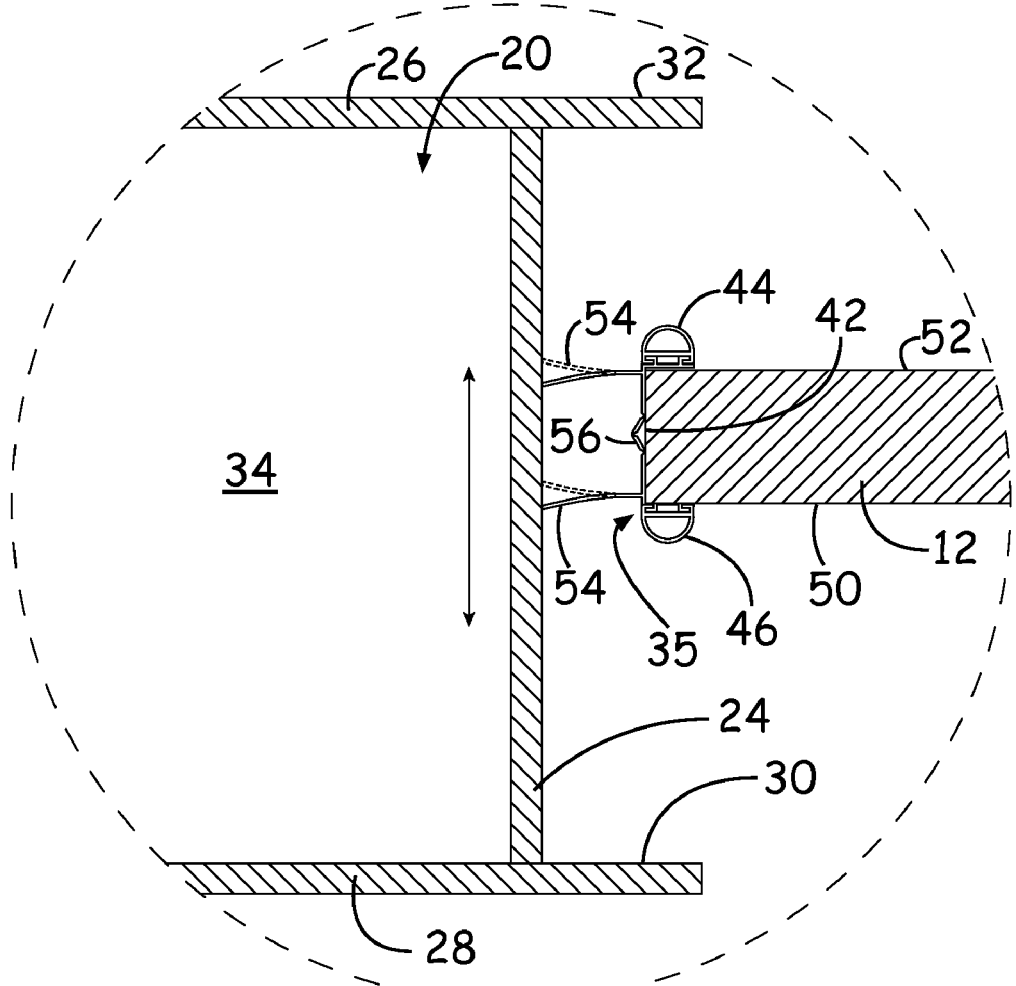
FIG. 3 is an enlarged view of a portion of FIG. 2, illustrating the resilient seal of the invention.
Figure 4:
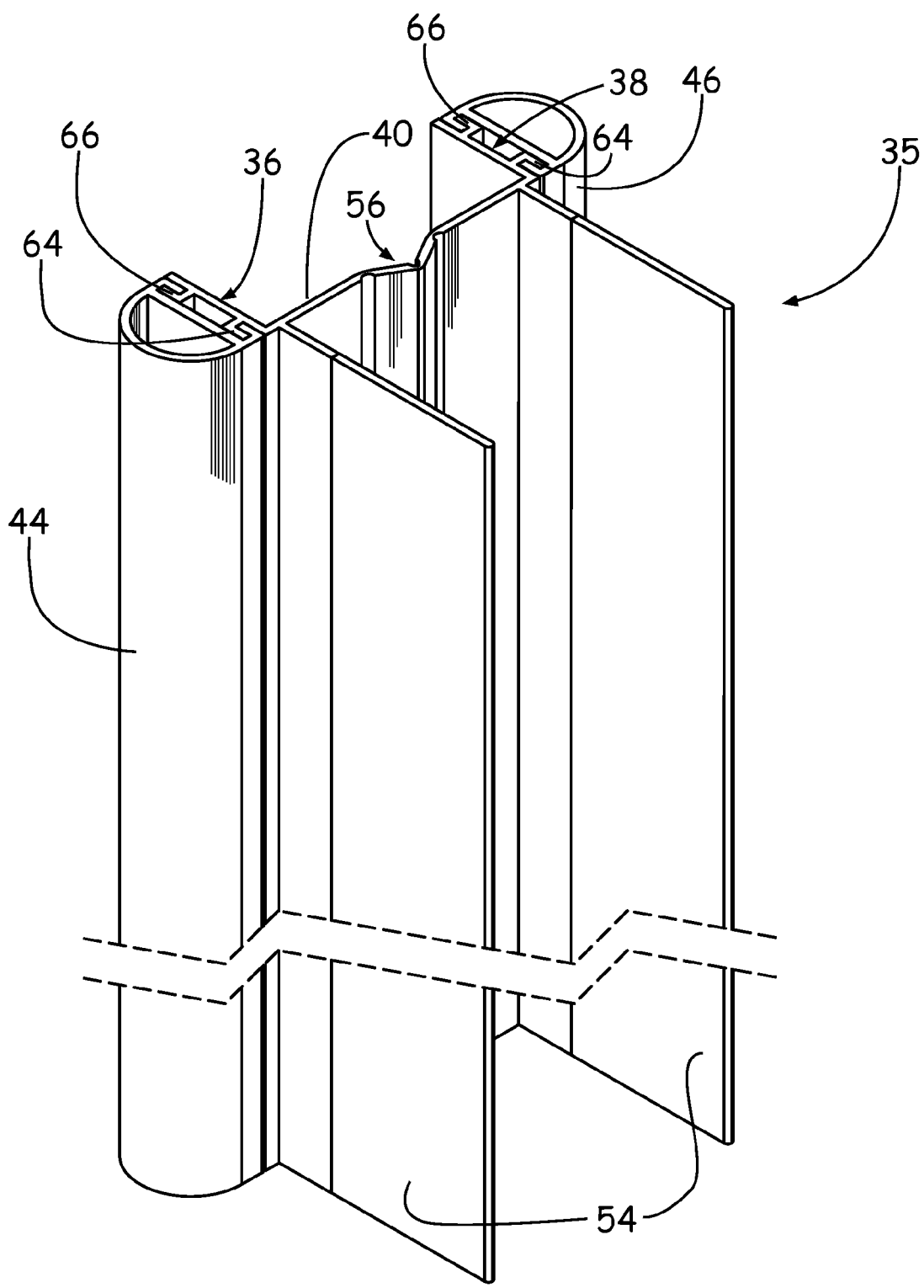
FIG. 4 is an enlarged view in perspective of the resilient seal illustrated in FIG. 2.
Figure 5:
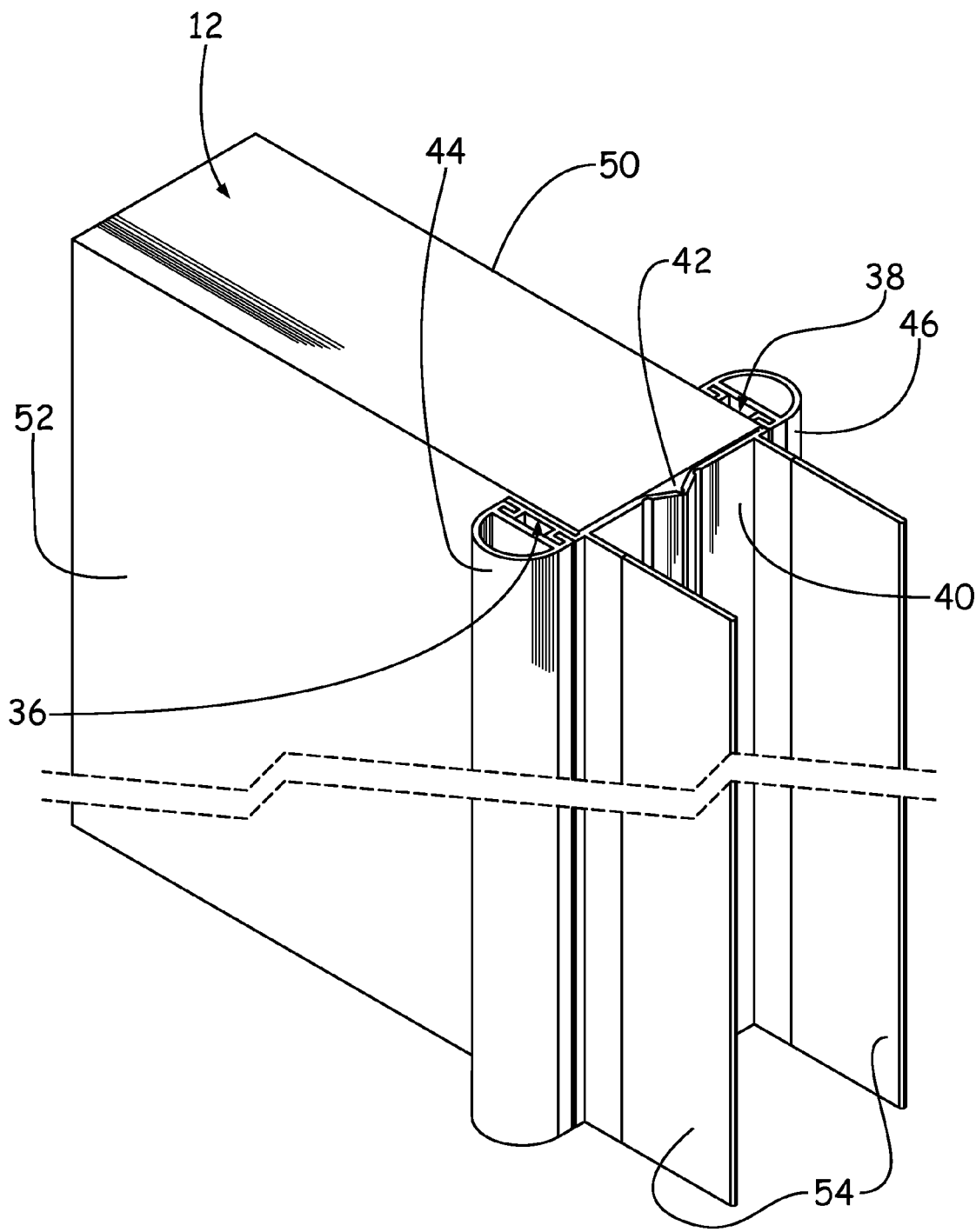
FIG. 5 is a view similar to FIG. 3, but illustrating the resilient seal installed on a wall of mobile living quarters.

Referring now to the drawings, mobile living quarters, such as the fifth wheel recreational vehicle generally indicated at 10, includes side walls 12 and a ceiling wall 14. The mobile living quarters 10 is mounted on wheels 16 for transport. An aperture 18 is provided in one of the side walls 12 and slidably receives a slide-out room 20. The side walls 12 and ceiling wall 14 cooperate to define a main living area generally indicated by the numeral 22. The slide-out room includes side walls 24, a ceiling wall 26, and a front wall 28. As known to those skilled in the art, the slide-out room 20 is mounted for movement through the aperture 18, so that it may be retracted into the main living quarters 22 when the unit is transported, but can be extended from the main living quarters when the unit is parked for use, thereby providing auxiliary living space. The slide-out room 20 includes a flange 30 extending around the side walls 24 and ceiling wall 26 at the front wall 28 and another flange 32 extending around the side walls 24 and ceiling wall 26 at the ends thereof opposite the ends joined to the front wall 28. The side walls 24, ceiling wall 26 and front wall 28 cooperate to define an auxiliary living area 34, which is available for use when the unit is parked and the slide-out room 20 is moved to the extended position.

It is necessary to assure that moisture, dirt, debris, etc. be prevented from entering the living quarters. Accordingly, bulb seals 44, 46 are mounted around the aperture 18 on an outside surface 50 and an inside surface 52 of the side wall 12 adjacent the aperture 18, and a wiper seal engages the side walls 24 and ceiling wall 26 of the slide-out room to wipe against the walls 24, 26 as the slide-out room 20 extends and retracts. Preferably, the bulb seals are made continuously, so that an appropriate length can be cut off and installed.

The seal assembly generally indicated by the numeral 35 includes a pair of longitudinal attachment members 36, 38, which are connected by a longitudinal connecting member 40, which extends over the transverse edge 42 of the sidewall 12. Bulb seals 44, 46 are manufactured separately and attached to their corresponding attachment members 36 and 38, as will be hereinafter described. To facilitate installation of the seal assembly 35 on the unit 10, a strip of double sided adhesive tape 48, one side of which is adhesively connected to the side of attachment member 38 which lies against the outside surface 50 of the wall 12, and is sufficient to loosely position attachment member 36 against the inside surface 52 of the wall 12 and the connecting member 40 over the transverse edge 42. The outside of the tape 48 is covered with a paper backing, which is stripped away to expose the adhesive just before the attachment member 38 is applied against the outside surface 50 to thereby hold the seal assembly 35 in place.

The seal assembly 35 is later firmly attached to the corresponding inside and outside surfaces 52 and 50 by appropriate fasteners, such as screws or nails, after the bulb seals 44, 46 are installed on the attachment members 36 and 38, such that the fasteners are driven through the bulb seals 44 and 46, the corresponding attachment members 36 and 38, and into the side wall 12. Wiper seals 54 extend from the connecting portion 40 and are adapted to flex against the side walls 24 and ceiling wall 26 of the slide-out room 20 during extension and retraction of the latter.

Figure 6:
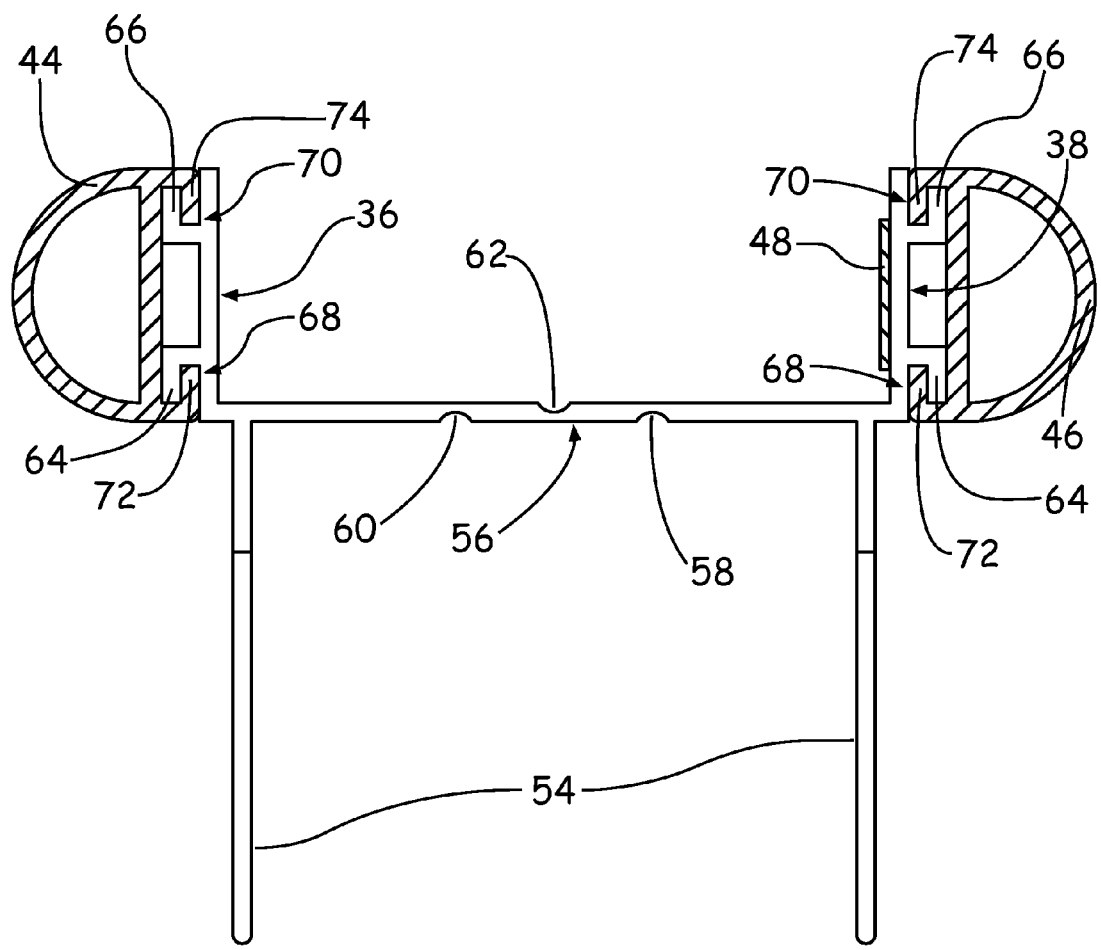
FIG. 6 is an enlarged, transverse cross-sectional view of the resilient seal illustrated in FIGS. 2-4, the seal being shown in the "open" position to accommodate installation on a wall that is relatively thick.

Different manufacturers of mobile living quarters manufacture the sidewalls thereof from different materials and thus the sidewalls of different manufacturers are of different thicknesses. However, it is clearly desirable that the number of different variations of the seal assembly 35 that must be manufactured be minimized. Accordingly, an accordion pleat 56 extends along the length of the connecting member 40 to permit the width of the connecting member 40 to be adjusted, to thereby accommodate walls of varying thicknesses, as illustrated in FIGS. 6 and 7.

Figure 7:
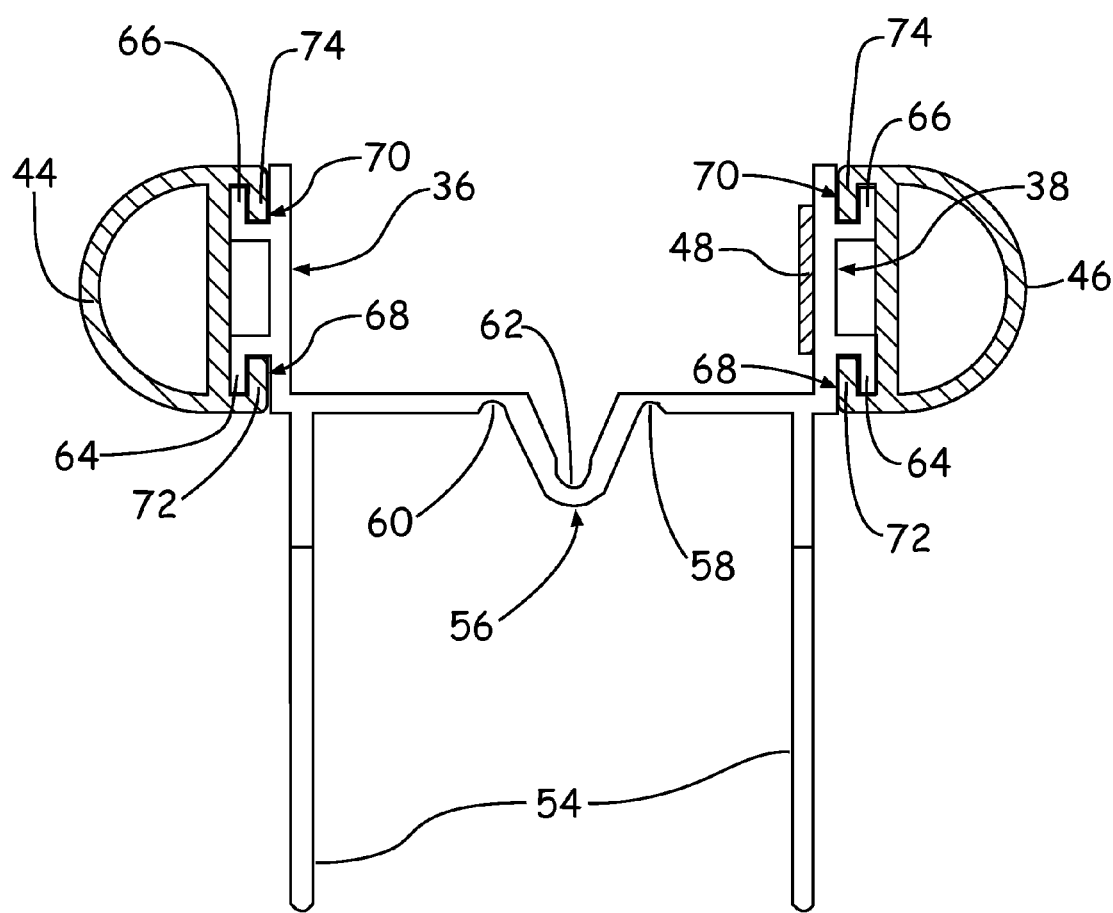
FIG. 7 is a view similar to FIG. 5, but illustrating the seal in the "closed" position to accommodate installation on a wall that is substantially less thick.

In FIG. 7, the seal assembly 35 is in a "closed" or narrow position, to accommodate a relatively narrow sidewall. In this position, the accordion pleat 56 projects into the space between the wiper seals 54. In FIG. 6, the seal assembly is in an "open" position, which accommodates the widest side wall 12. In this position, the accordion pleat 56 is stretched out so that the connecting member lies substantially flat against the transverse edge 42. It will be noted that as the attachment members 36, 38 are secured to their corresponding inside and outside surfaces 50, 52, the width of the connecting member 40 automatically adjusts to accommodate a sidewall 12 of any thickness between those accommodated by the fully open and fully closed positions of FIGS. 6 and 7. The pleat 56 is formed by scoring parallel, longitudinal score lines 58, 60 on the side of the connecting member 40 facing away from the transverse edge 42 and between the wiper seals 54, and by forming a third longitudinal score line 62 on the side of the connecting member 40 that lies against the transverse edge 42 when the seal assembly is installed on the side wall 12. The third score line 62 extends parallel to the score lines 58, 60 and is located midway between them. The first, second and third score lines define corresponding first, second and third fold lines, thereby forming the accordion pleat 56.

Each of the attachment members 36, 38 are provided with a pair of longitudinal, parallel rails 64, 66 which cooperate with the body of the corresponding attachment member 36 or 38 to define a corresponding pair of grooves 68, 70. Each of the bulb seals 44, 46 are formed with a pair of longitudinal, parallel, inwardly projecting tabs 72, 74 that project toward one another and are received within a corresponding one of the grooves 68 or 70 when the bulb seals 44, 46 are installed on the attachment members 36 and 38. The bulb seals 44, 46 are sufficiently flexible that they may be flexed during installation on the attachment member 36, 38 to cause the tabs 72, 74 to be received within their corresponding grooves 68 or 70. Alternatively, the bulb seals 44, 46 may be installed upon the attachment members 36, 38 by sliding the bulb seals 44, 46 over the ends of the rails 64, 66 and then sliding the bulb seals along the rails. After the bulb seals 44, 46 are properly positioned on their corresponding attachment member 36, 38, fasteners (not shown), such as screws or nails, may be driven through the bulb seals 44, 46 and their corresponding attachment members 36, 38 and then into the side wall 12. It will be remembered that prior to installation of the fasteners, the seal assembly 35 is temporarily loosely secured by the tape 48.

What is claimed is:

1. A resilient seal for mobile living quarters having main living area walls defining a main living area, an aperture in one of said main living area walls slidably receiving a slide-out room having slide-out room walls defining auxiliary living space, said one main living area wall having an outside surface, an inside surface, and a transverse surface extending between the inside and outside surfaces, said transverse surface defining said aperture, said resilient seal having a pair of attaching members extending along said one main living area wall at said aperture and a connecting member extending between said attaching members and along said transverse surface, said connecting member including an adjuster for adjusting the distance between the attaching members, wherein the adjuster is an accordion pleat in said connecting member.

2. Resilient seal as claimed in claim 1, wherein said accordion pleat is defined between first and second parallel score lines defining a pair of corresponding fold lines, and a third score line defining a third fold line between and extending parallel to said first and second score lines.

3. Resilient seal as claimed in claim 1, wherein a bulb sealing portion is mounted on said attaching members.

4. Resilient seal as claimed in claim 3, wherein said slide-out room is movable between fully extended and fully retracted positions and carries a pair of offset flanges projecting outwardly from said slide-out room walls, one of said flanges engaging a corresponding one of said seals when said slide-out room is in the fully extended position, the other flange engaging the other seal when said slide-out room is in the fully retracted position.

* * * * *